United States Patent [19]

Krijgsman

[11] 4,278,277

[45] Jul. 14, 1981

[54] STRUCTURE FOR COMPENSATING FOR DIFFERENT THERMAL EXPANSIONS OF INNER AND OUTER CONCENTRICALLY MOUNTED PIPES

[76] Inventor: Pieter Krijgsman, P.O. Box 68, 8050 AB, Netherlands

[21] Appl. No.: 60,998

[22] Filed: Jul. 26, 1979

[51] Int. Cl.³ .............................................. F16L 35/00
[52] U.S. Cl. ...................................... 285/93; 285/138; 285/187; 285/300; 285/381; 285/286; 285/14
[58] Field of Search ............... 285/299, 300, 301, 138, 285/47, 226, 187, DIG. 5, 93, 13, 14, DIG. 25, 286, 381; 138/149

[56] References Cited

U.S. PATENT DOCUMENTS

| 2,419,278 | 4/1947 | Mutsenbucker | 285/47 X |
| 3,068,026 | 11/1962 | McKamey | 285/138 X |
| 3,488,067 | 1/1970 | Sommer | 285/47 X |
| 3,574,357 | 4/1971 | Alexander | 285/47 |
| 3,608,640 | 9/1971 | Willhite | 166/315 |
| 3,693,665 | 9/1972 | Veerling | 138/149 |
| 4,046,407 | 9/1977 | Porrelo | 285/299 X |

FOREIGN PATENT DOCUMENTS

| 569050 | 1/1959 | Belgium | 285/226 |
| 855356 | 11/1960 | United Kingdom | 285/299 |
| 898383 | 6/1962 | United Kingdom | 285/300 |

OTHER PUBLICATIONS

General Electric, Therm-O-Case III, Insulation Assembly, 1979, 1 page dwg.

Primary Examiner—Dave W. Arola
Attorney, Agent, or Firm—Alan H. MacPherson

[57] ABSTRACT

The annular space between inner and outer coaxially-mounted pipes is sealed by a bellows diaphragm with a cylindrical surface corrugated in the longitudinal direction formed in and at one end of said annular space, wherein one end of said bellows is circumferentially attached to a circumferential portion of the outer surface of the inner pipe and the other end of said bellows is circumferentially attached to a circumferential portion of the inner surface of said outer pipe. The other end of said annular space is sealed by a ring attached to a circumferential portion of the outer surface of the inner pipe and to a circumferential portion of the inner surface of the outer pipe. In one version of the invention this ring includes a pressure release valve to allow any high pressure fluids in the annular space to escape.

8 Claims, 5 Drawing Figures

STRUCTURE FOR COMPENSATING FOR DIFFERENT THERMAL EXPANSIONS OF INNER AND OUTER CONCENTRICALLY MOUNTED PIPES

BACKGROUND OF THE INVENTION

1. Field of the Invention

This invention relates to insulated pipe strings for use in injecting high temperature fluids into oil fields and more particularly to structure for closing the ends of the annular space between two coaxially-mounted pipes so as to prevent impurities from entering this annular space while allowing relative longitudinal movement of the two pipes. This invention is usable in any application wherein high temperature fluids must be passed through an insulated pipe string at high pressures.

2. Prior Art

The injection of high temperature fluids into oil bearing strata is a common operation. In one application, high temperature steam at pressures up to, for example, 120 atmospheres, is injected into oil bearing strata to increase the recovery of oil from that strata. Insulating the pipe through which the steam is injected increases injection efficiency by reducing heat loss from the steam. This lowers costs, and by lowering the temperature of this casing reduces the likelihood that the casing will crack. If the casing cracks, it must be replaced. This is expensive.

An insulated pipe for such use in an oil well is disclosed in U.S. Pat. No. 3,574,357. In this patent the inner pipe through which the high temperature fluid flows has its upper end flared outwardly to receive the lower end of the adjacent mating pipe in a sliding, telescopic relationship. The inner pipe is then wrapped in insulation which in turn is surrounded by an outer load bearing pipe. The use of the outer pipe as the load bearing and pressure containing pipe increases the cost of the pipe string because the larger, outer pipe is more expensive than the inner pipe and must be of sufficient size and strength to hold the weight of the pipe string in the oil well. Moreover, inner telescoping pipes are likely to bind and therefore not slide freely, or to leak at the high pressures used with steam injection (such as 120 BARs) thereby allowing steam to enter the insulation and degrade its performance.

U.S. Pat. No. 2,419,278 discloses another approach to the solution of this problem. This patent proposes connecting an inner, fluid-bearing pipe to an outer load-bearing pipe through a bellows pipe flange welded to the edges of both the inner and outer pipes across the end of the annular space. This bellows shaped annular disc or plate extends in a radial direction from the inner to the outer pipe, thus limiting the total amount of longitudinal motion (i.e., motion along the pipe length) of the fluid-carrying inner pipe. Moreover, should a leak occur in this bellows-shaped disc, high pressure fluid or oil can enter the annular region thereby contaminating the insulation thus reducing its insulating properties. Upon removal of the pipe from the hole, should the small leak in the bellows shaped disc be clogged, the high pressure within the annular region creates a dangerous risk of explosion. In addition, this particular structure has a relatively limited ability to compensate for the different longitudinal expansions of the inner and outer pipes caused by the different temperatures at which these pipes operate. Thus only a limited longitudinal expansion of the inner pipe is allowed before the inner pipes in two directly adjacent sections come into contact and are unable to further longitudinally expand. Furthermore, experience has shown that the welds in pipes carrying high pressure fluids in corrosive environments such as a typical oil well are more likely to fail due to stress fatigue in the crystal-lographically altered pipe material next to the weld. Thus the solution in this patent is not suitable for the extremely high temperature and pressure operations now carried out in some oil fields.

A similar problem arises in two heat exchangers wherein fluid passing through tubes is changed in temperature by fluid passing on the outside of the tubes. When it is desired to prevent any mixing of the two fluids but at the same time allow for different longitudinal expansions of the tubes, an annular-shaped bellows is used to mount one end of the tubes to a stationary support structure. Such an annular-shaped bellows is disclosed for example in Belgian Pat. No. 569,050, patented on Jan. 2, 1959.

U.S. Pat. No. 3,693,665 issued Sept. 26, 1972, discusses the use of concentrically mounted pipes for the transport of cold liquids. In describing the prior art this patent states on Column 1, lines 58–63, "In known pipe lines of the above type, the shrinkage of the inner pipe is absorbed without great stresses by using bellows between successive inner pipes, or by providing the inner pipe with corrugations for part or all of its length." The patent then explains that pipelines with this structure have various disadvantages. In particular, the patent explains that "Bellows are weak points in a pipe line and repair or replacement is often difficult or impossible, especially in the case of submerged pipelines. Besides, bellows or corrugations have the disadvantage of causing extra flow resistance. Moreover, a corrugated inner pipe can only be produced by one of the few specialized manufacturers." Accordingly, the '665 patent disclosed a structure which allegedly overcame the disadvantages of a bellows-shaped inner pipe.

Other patents disclosing insulated pipes include U.S. Pat. Nos. 3,032,070, 3,068,026, 3,388,724, 3,511,282, 3,563,572, 3,608,640, 3,654,691, 4,025,091, 3,850,714, 4,139,024, 3,693,665, and 4,130,301.

SUMMARY OF THE INVENTION

In accordance with this invention, a structure for closing the annular section between two telescopically-movable, coaxial pipes is provided which substantially overcomes the problems of the prior art. This structure not only avoids welding a connection to the inner pipe but allows the inner pipe string to move unrestrictedly in the longitudinal direction without hinderance from the outer pipe encasing the insulation in the annular space between the outer and inner pipes. Moreover, the invented closure is mounted on the inner pipe of the pipe string in a manner so as not to induce structural weaknesses in this pipe string. The structure further provides a means for relieving any pressure which might build up in the annular space between the inner and outer pipes thereby to reduce the likelihood of an explosion upon removal of the pipe from the well. The closure structure is particularly adapted for use with a pipe string wherein the inner of the two coaxial, concentrically-mounted pipes comprises the load bearing and pressuure containing pipe but can also be used in a pipe string where the outer pipe carries the load and retains the pressure.

According to this invention, a closure structure comprises a substantially cylindrical diaphragm formed with corrugations such that its substantially cylindrical surface possesses alternating grooves and ridges in the longitudinal direction. This corrugated diaphragm is hereinafter called either an "annular-shaped bellows means," an "annular-shaped bellows" or a "bellows." One end of the bellows is circumferentially attached to a circumferential portion of the outer surface of the inner pipe and the other circumferential end of the bellows is circumferentially attached to a circumferential portion of the inner surface of the outer pipe. The bellows expands or contracts in response to relative longitudinal or radial movements of the inner and outer pipes.

In accordance with one embodiment of this invention, the bellows is attached not directly to the inner pipe but rather to a circular pipe section with an inner diameter slightly smaller than the outer diameter of the inner pipe in the pipe string. The circular pipe section in turn is shrunk fit over the end portion of the inner pipe in the pipe string. Attached to one end of the pipe section (typically be a weld) is a positioning ring adapted to insure that the outer pipe is always properly centered about the inner pipe. Attached to one side of this ring is the annular-shaped bellows. The other end of this annular-shaped bellows is attached to a second ring which is welded to the inside surface of an outer pipe section. This outer pipe section is welded to the end of the outer pipe covering the insulation surrounding the inner pipe. Thus the bellows together with the ring structure at each end comprises a flexible closure for the annular section containing the insulation. While the bellows will flex radially, the bellows mainly expands or contracts along the longitudinal axis of the pipe string.

The structure of this invention provides several advantages over the prior art. When the inner pipe comprises the load bearing and pressure containing pipe, it is allowed to expand or contract as a function of temperature without restriction from the outer pipe. To achieve this, the outer pipe is terminated a selected distance short of the coupling between adjacent inner pipes thereby to insure that the outer pipes in no way restrict the longitudinal movement of the inner pipes. To provision of a pressure relief valve in the sealing structure of the invention allows the release of any high pressure in the annular space between the inner and outer pipes should a leak occur in the system which subsequently becomes clogged. This prevents the explosion of such pipes upon their removal from the well. The structure of this invention requires no welds to be made to the inner pipe thereby reducing the likelihood that the inner pipe will either explode or otherwise fracture at defects introduced in the pipe by welds although if desired, the closure structure can be joined to the inner pipe by a combination of shrink fitting and welding.

DETAILED DESCRIPTION

This invention will be described in conjunction with a pipe string for use in injecting steam into an underground oil bearing strata. However this invention can be used in other applications such as those involving the high pressure injection of high temperature fluids in the recovery of sulphur or other minerals from underground deposits.

Figure 1:
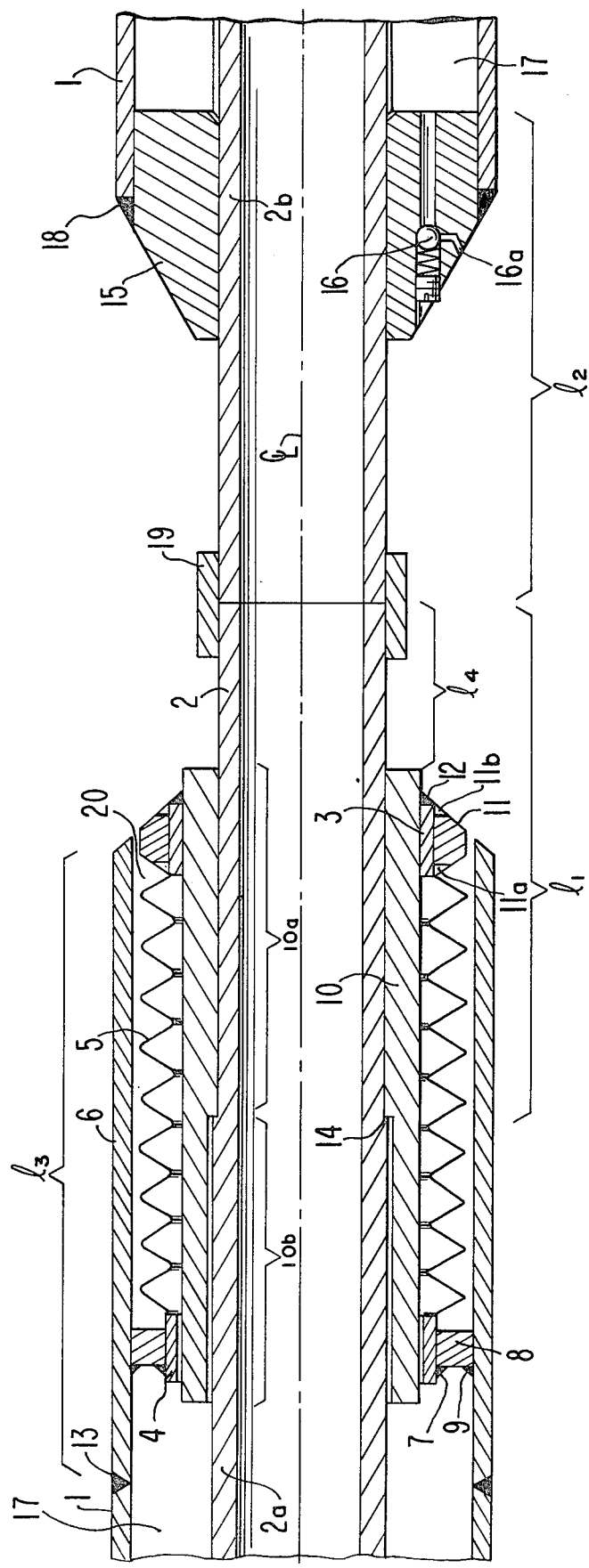
FIG. 1 shows in cross-section the structure of this invention together with the coupling between two adjacent pipe sections of a pipe string.

Turning to FIG. 1, one embodiment of the structure of this invention is there illustrated. The pipe string comprises two coaxially arranged pipe sections, outer pipe 1 and inner pipe 2. Typically, the ends of pipe 2 are turned down on a lathe to insure that they are substantially round. Thus the end lengths 11 and 12 of the two abutting pipes 2a and 2b are slightly smaller in outside diameter than the remaining sections of these pipes. These ends are sufficiently circular to insure that the pieces 10 and 15 which are shrunk fit over these ends fit with no leaks between pipe 2 and materials 10 and 15. Material 10 comprises a section of a pipe, the inner diameter of which along length 10a is similarly substantially circular and slightly smaller in diameter than the outer diameter of pipe 2. Thus to place section 10 on pipe 2, section 10 is heated to a temperature such as in the range of 325° C. to 350° C. or thereabouts to expand this material. Material 10 is then gently slipped over the end of pipe 2a and cooled. Upon cooling, material 10 firmly grips the end of pipe 2. The innermost portion of material 10 corresponding to length 10b has been machined to provide a slightly larger inside diameter such that this portion of material 10 will slip over that portion of pipe 2 which has not been turned down on a lathe.

The shrink fitting of pipe section 10 (called a safety shrink cylinder) must be done carefully, keeping in mind two limitations on the forces to be created by the shrink fit between material 10 and pipe 2. The force exerted by material 10 on pipe 2 must not exceed that limit above which pipe 2 will fracture. On the other hand, this force cannot be beneath the force necessary to maintain material 10 firmly in place on pipe 2 in the situation where maximum pressure exists in the annular space 17 between outer pipe 1 and inner pipe 2. The pressure in the annular space can become as high as 165 BARs. Moreover, material 10 must grip pipe 2a with sufficient force to minimize the possibility of leakage between these two materials into annular space 17. As will be seen later, the total structure is capable of withstanding a higher pressure than this for safety purposes. The sizing of the maximum inner diameter of section 10a of material 10 and the minimum outer diameter of the adjacent portion of pipe 2 is critical to achieving the proper grip of material 10 on pipe 2.

Attached to the right hand portion of material 10 as shown in FIG. 1 is a first ring 3 which is slipped over the material 10 and joined to that material with a weld 12. On the outer portion of ring 3 is mounted another ring 11 which is welded to ring 3 by welds 11a and 11b.

Bellows shaped material 5 is welded to the left side of ring 3. (The terms left and right are used in this application to denote the positions of structure shown in FIG.

1 when that figure is held in its normal viewing position.) Material 5 typically is 0.8 mm thick and is fabricated of Incoloy 825 according to the published specifications of Henry Wiggin & Company Limited in England. Incoloy 825 is highly resistant to corrosive media, particularly media containing $H_2S$ and other similar aggressive elements detrimental to normal stainless and other steels. The other end of bellows 5 is welded to ring 4. Ring 4 is welded to outer ring 8 by weld 7 and outer ring 8 is welded to the inside face of pipe section 6 by weld 9. Pipe section 6 is sized such that its inside diameter is equal to the inside diameter of pipe section 1 which forms the outer shell surrounding the annular space 17 in which is placed a selected insulation such as calcium silicate. Pipe section 6 is welded to pipe 1 by weld 13.

The length 13 of pipe section 6 is selected such that this pipe section extends from the end of pipe 1 to just above ring 11. Pipe section 2 extends beyond material 10 by a sufficient distance 14 to allow the pipe 2 to be gripped, to allow threads to be formed on this end of pipe 2, and to allow a coupling 19 (shown schematically) to be screwed onto the ends of both pipes 2a and 2b to join these two pipes. This small portion of the inner pipe is left uninsulated but the total length left uninsulated is small relative to the total length of pipe 2 which is insulated thus insuring that the heat loss through this uninsulated portion of the pipe is small compared to the total energy in the fluid being passed through the inner pipe.

At the other end of pipe 2a (illustrated in FIG. 1 in conjunction with pipe 2b) an annular ring 15 is shrunk fit onto the left end of pipe 2b. This ring 15 again is sized to insure that the compressive forces created by ring 15 on the portions of pipe 2b in contact with ring 15 are not sufficient to fracture this pipe but are still sufficient to prevent leakage and to prevent ring 15 from being forced off the end of the pipe due to pressure in the annular space 17 containing the insulation. Weld 18 joins pipe 1 to ring 15. When the pipe string is installed in the well, ring 15 bears the weight of outer pipe 1 thereby avoiding using bellows 5 as a load bearing as well as a thermal compensating structure.

Contained in one portion of ring 15 is a pressure relief valve 16 (shown schematically) for the purpose of relieving any pressure which might form in annular space 17 due to a leak between pipe 2b and annular ring 15, for example, or between material 10 and pipe 2a. This valve is designed to open as the pipe is being removed from the well if there are high pressure fluids in this annular space. This this valve allows any high pressure fluids in the annular space to be released when the pressure in the well drops below a selected level thereby preventing the explosion of this pipe section when it reaches the surface. Such explosions in the past have been known to injure or kill nearby workers. Valve 16 can be of any well-known design and in one embodiment comprises a spring loaded ball in a seat which is lifted from its seat by pressure in annular space 17 (the actual pressure at which this happens is controlled in a well-known manner by the stiffness of the spring) thereby to release the pressure in space 17 to the well or to the atmosphere through passage 16a.

Figure 4:
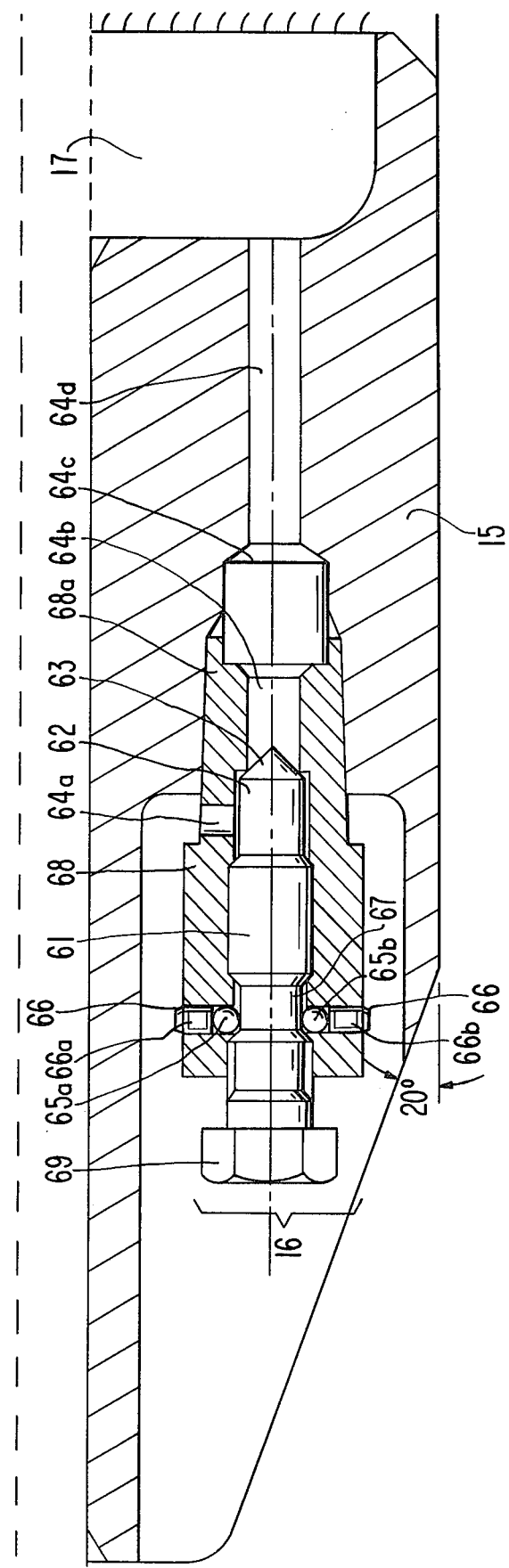
FIG. 4 illustrates schematically in cross-section a pressure release valve suitable for use in this invention.

FIG. 4 shows an alternative embodiment of a valve suitable for use in this invention. This valve is designed to release high pressure fluids in the annular space 17 between inner pipe 2 and outer pipe 1 after the pipe string has been removed from the well in situations where the pressure build-up in the annular space 17 is not sufficient to cause explosions but where it is desired to determine whether or not fluids have leaked into annular space 17 while the pipe string was in the hole. Valve 16 is formed in annular ring 15 as shown in FIG. 4. The valve contains a valve seat 68 screwed into an opening formed in annular ring 15 and a valve stem 61 screwed into the valve seat 68. An opening 64a is blocked by insertion of portion 62 of valve stem 61 into valve seat 68 such that the pointed end 63 of valve stem 61 protrudes into and blocks the passage of fluid from opening 64b in the lower portion 68a of seat 68. When stem 61 is screwed completely into seat 68 no fluid can pass from annular space 17 through flow passages 64d, 64c, 64b, past end 63 and portion 62 of plug 61 into exit passage 64a. However, upon the unscrewing of plug 61 by placing a wrench on hex nut 69, portions 62 and 63 of the plug are withdrawn from the opening 64b thereby allowing fluid to pass out exit 64a. This allows a check to be made when the pipe has been removed from the well to determine whether or not fluid has leaked into annular space 17. The disadvantage of a spring loaded valve for this purpose is that this valve would allow any fluid to flow from annular space 17 before the pipe was removed from the well, making it more difficult to determine whether or not fluid had leaked into annular space 17. Thus the choice of whether to use the valve shown in FIG. 4 or the well-known spring-loaded type valve depicted schematically in FIG. 1 depends upon whether the annular space is designed to withstand the expected pressures to be formed in this space should a fluid leak into the annular space and on whether it is desired to determine the presence, if any, of leakage into annular space 17. Of course both types of valves can be used simultaneously if desired to reduce the likelihood of explosions and, at the same time, allow one to find out whether or not fluid had leaked into space 17. This combination of valves is based on the recognition that a spring-loaded valve automatically closes before all the fluid has passed from space 17 and this residual fluid can then be drained through a plug such as shown in FIG. 4. Alternatively the spring-loaded valve can be removed for this purpose thereby avoiding the use of a second valve. The valve 16 in ring 15 (FIG. 1) can also be adapted to allow annular space 17 to be evacuated thereby to increase its insulating effectiveness.

Upon unscrewing stem 61 from seat 68, the recessed portion 67 of stem passes by balls 65a and 65b. These balls are placed in openings 66 formed in the side of seat 68. Balls 65a and 65b, (although only two such balls are shown, typically four or more balls are used equally spaced around recess 67) for example, are inserted into these openings and held in place by a set screw or an expandable pin filled with Molycote paste. These balls are adapted to allow stem 61 to rotate and withdraw from opening 64b but to prevent the stem from being completely removed from seat 68 thereby to prevent pressure in annular space 17 from blowing the stem 61 out of the hole and injuring a worker.

Ring 4 (FIG. 1) is designed to slidably fit around the portion 10b of shrink fit cylinder 10. Thus when pipe 2 goes up in temperature, it expands longitudinally and radially relative to cooler pipe 1 thereby causing relative motion between material 10 shrunk fit to pipe 2a and ring 4 welded through ring 8 to pipe 6. Ring 4 must not grip portion 10b of shrink fit cylinder 10 thereby to allow relative longitudinal motion between these materials. Bellows 5 expands with this relative motion while maintaining, however, a seal across the end of annular space 17.

Figure 2:
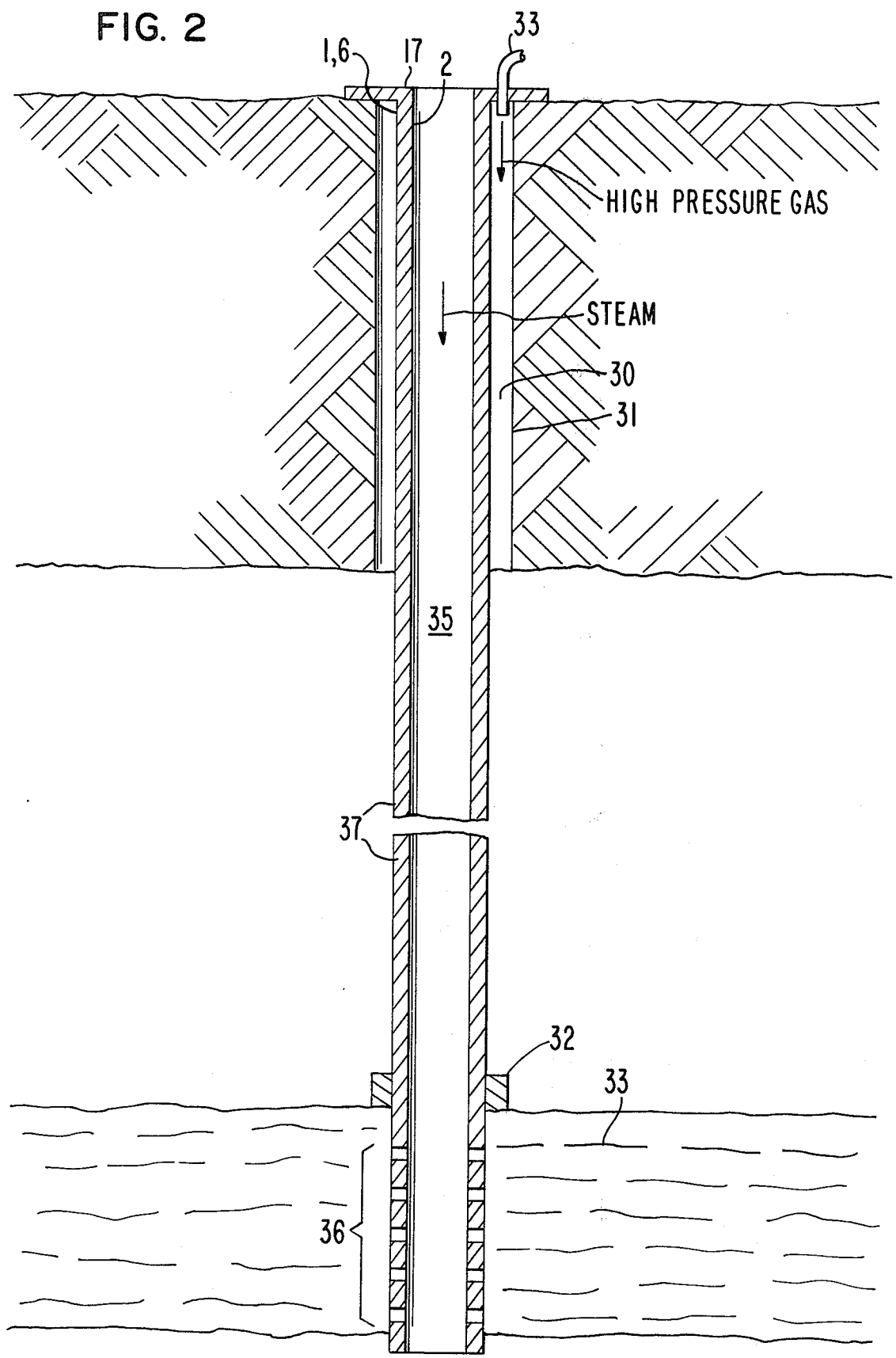
FIG. 2 shows schematically in cross-section an insulated pipe string in an oil well for the purpose of steam injection into oil bearing strata.

FIG. 2 illustrates schematically an oil well in which the pipe string containing the annular seal of this invention is typically used. High pressure steam is passed through pipe 2 to the bottom of the well for injection into oil bearing strata through perforations (shown schematically) in an oil well liner 36. A plug or packing 32 (typically of concrete) is formed around the lower portion of pipe string 37 just above the oil bearing strata into which steam is to be injected. The steam is injected under high pressure, in one application at about 120 BARs. Thus very high forces are created on concrete plug 32. To balance these forces, high pressure gas is often injected through valve 38 at the top of the oil well into annular space 30 between pipe string 37 and cement liner 31. This high pressure gas balances the forces on the bottom of concrete plug 32 from the injected steam thereby insuring that the plug 32 is not dislodged by the steam pressure. Turning to FIG. 1, this high pressure gas naturally permeates the space 20 on the inside of pipe section 6 and outside bellows shaped diaphragm 5. Diaphragm 5 then is pressed against and supported by the outer surface of pipe section 10 but otherwise is not affected by this pressure. Ring 8 is held in place against this pressure by welds 7 and 9.

Expansion of pipe string 2 during injection of high temperature steam is compensated for by hydraulic jacks which lift the drilling platform an amount equal to the expansion of pipe string 2.

During assembly of the sealing structure shown in FIG. 1, section 10 is shrunk fit over the end 10a of pipe 2a. Then an assembly comprising pipe section 6, ring 8 and ring 4 with bellows shaped diaphragm 5 attached to ring 4 and rings 11 and 3 attached to the right end of diaphragm 5, is slid over section 10. Weld 12 then joins annular ring 3 to the right hand portion of material 10 as shown in FIG. 1 and weld 13 joins pipe section 6 to the end of pipe 1. Only two welds are necessary to assemble the sealing structure during the final assembly stage.

The structure of this invention is particularly useful to prevent oil and other hydrocarbons from penetrating the annular space between inner pipe 2 and outer pipe 1 thereby to contaminate the insulation and reduce its insulating ability. Such contamination ruins the particular pipe section and thus might require an expensive replacement.

Figure 3:
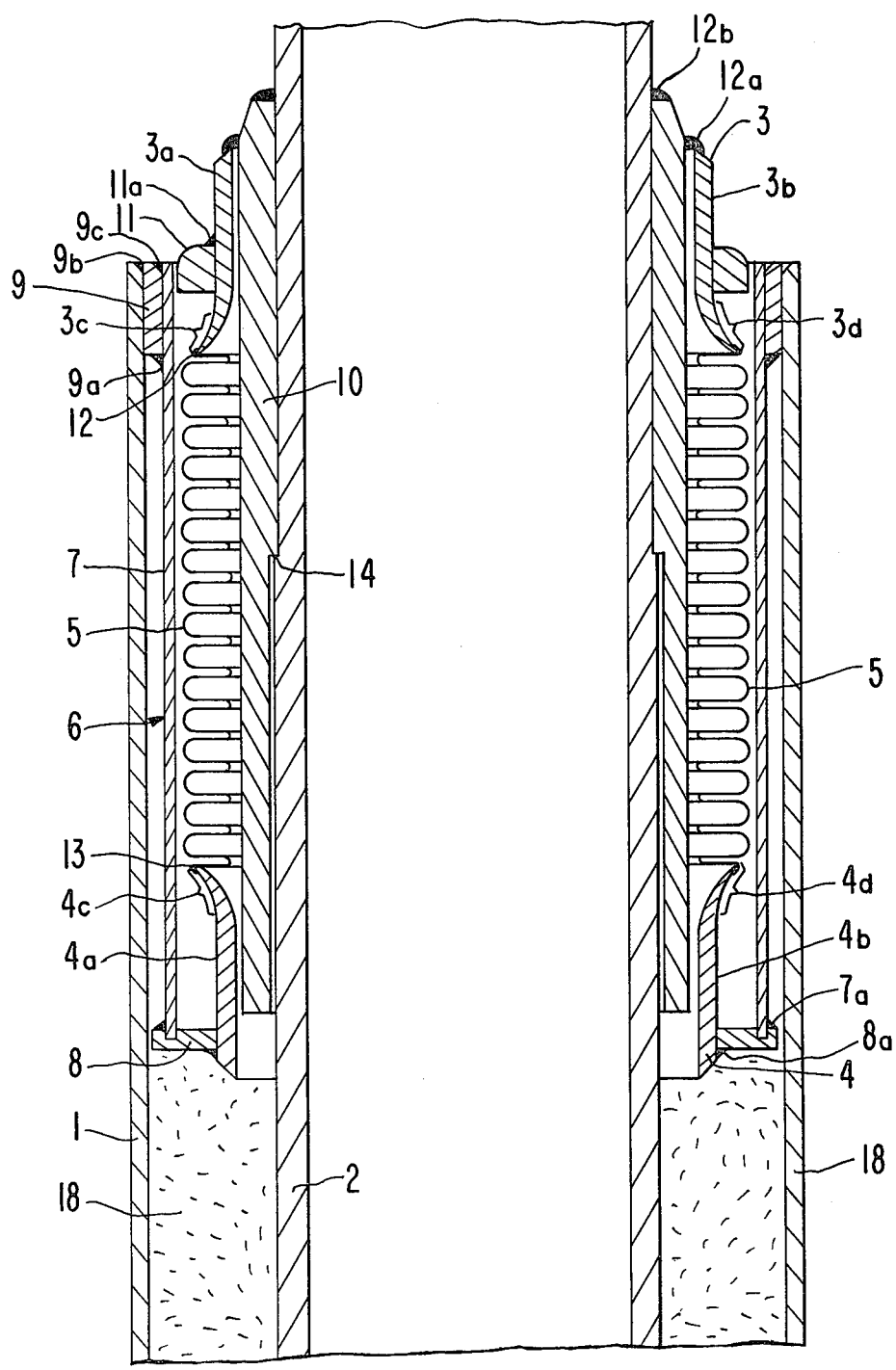
FIG. 3 illustrates schematically in cross-section an alternative embodiment of this invention.

Another embodiment of this invention is shown in FIG. 3. In this embodiment, the annular-shaped bellows means 5 is attached to the inner material 10 shrunk fit on one end of the inner pipe 1 by means of an extended annular collar 3 of which cross-sections 3a and 3b are shown in FIG. 3. Annular collar 3 has an outwardly flared portion (shown as cross-sections 3c and 3d), to which is attached (typically by welding) one end of the bellows-shaped diaphragm 5. The other end of bellows-shaped diaphragm 5 is attached to the outwardly flared end (shown in cross-sections 4c and 4d) of annular-shaped collar 4. Collar 4 is movably mounted around inner pipe 2 and pipe section 10 attached thereto such that collar 4 can move relative to pipe 2 and pipe section 10 along the longitudinal axis of pipe 2. An annular ring 8 is attached (typically by means of weld 8a) to an outer circumference of collar 4. A thin annular-shaped pipe section 7 is then attached to the outer portion of annular ring 8 by means of weld 7a. Pipe section 7 extends inside outer pipe 1 to the end of outer pipe 1 approximately adjacent to collar 3. Annular-shaped ring 9 is then attached to that end of pipe section 7 adjacent collar 3 by weld 9a and is attached to an inside circumferential portion of the end of pipe 1 adjacent collar 3 by welds of which cross-sections 9b and 9c are shown. Annular-shaped collar 11, attached by weld 11a to a circumferential portion of collar 3, ensures that outer pipe 1 is properly positioned relative to inner pipe 2 so as not to crush or otherwise deform bellows 5.

Figure 5:
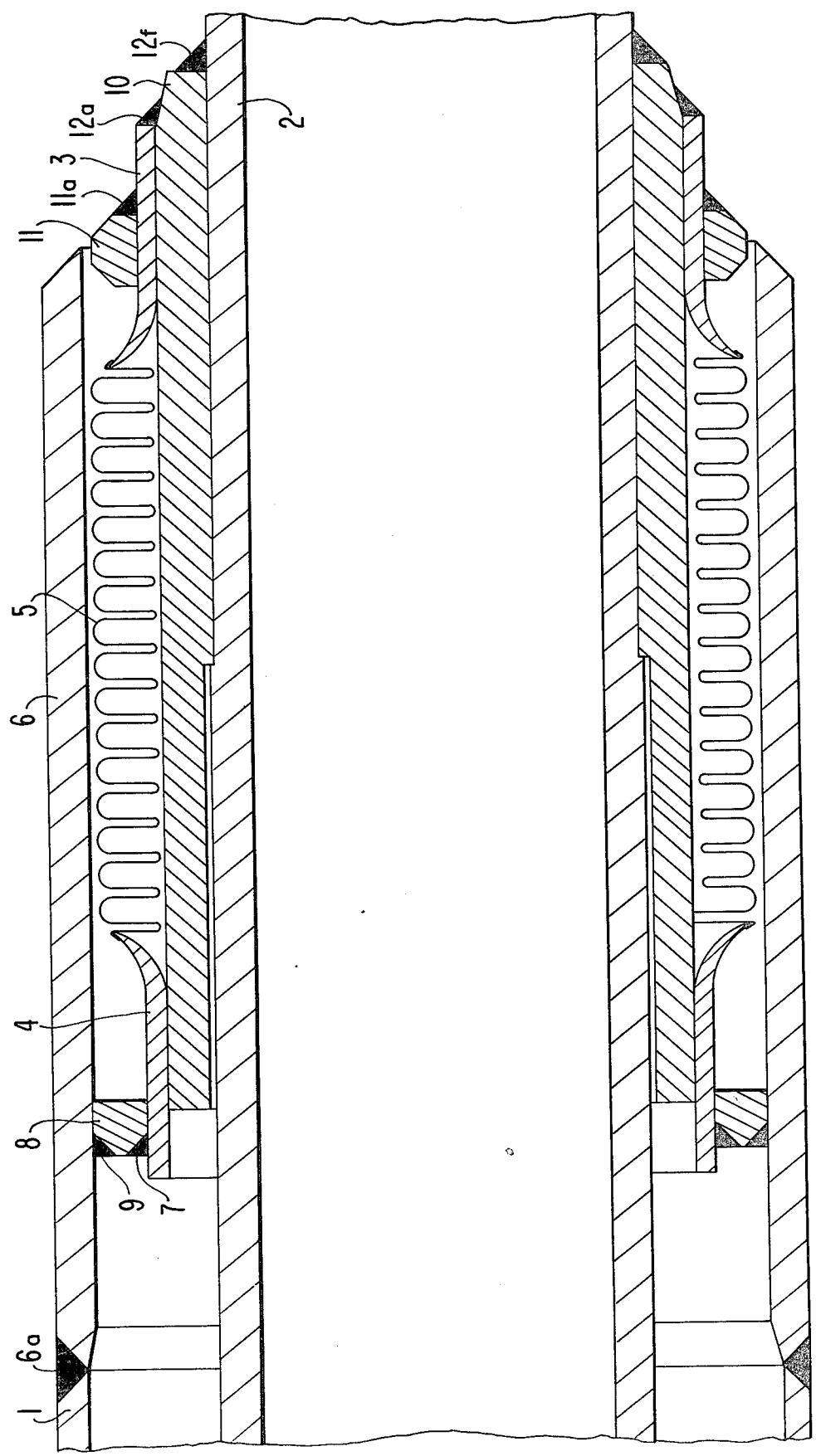
FIG. 5 discloses an alternative embodiment of the structure shown in FIG. 3 wherein the sleeve 7 is eliminated.

In the embodiments shown in FIGS. 1, 3 and 5 (to be described), bellows 5 is preferably formed on Incoloy 825. Collars 3 and 4 are also formed of Incoloy 825. Ring 8, annular section 7 (FIG. 3), ring 9 and ring 11 are formed of stainless steel but also can be formed, if desired, of Incoloy 825. Cylindrical material 10 adapted to be shrunk fit into pipe 2 is made of SKF 280 manufactured by Svenska Kugellager Fabrik A.G.

Weld 12a (FIGS. 3 and 5) and weld 12 (FIG. 1) join collar 3 to shrunk fit cylindrical material 10. Weld 12a is preferably made using an Inconel 182 electrode. Weld 12b is preferably made using a Ductiland 50 basic electrode.

As will be apparent from the above descriptions of this invention, bellows 5 is adapted to be mounted in the annular space between an inner and outer pipe so as to be capable of expanding or contracting along the longitudinal axis of the two pipes. The first embodiment of the invention (FIG. 1) attaches the end of the bellows closest to the end of the inner pipe to a circumferential portion of the outer surface of the inner pipe. The other end of the bellows is attached to a circumferential portion of an inner surface of the outer pipe directly adjacent to the other end of the bellows. In the alternative embodiment (FIG. 3), the one end of the bellows is attached to a circumferential portion of the outer surface of one end of the inner pipe and the other end of the bellows is attached by means of a cylindrical extender to a circumferential portion of the inner surface of the outer pipe adjacent approximately to the one end of the bellows. Naturally, the one end of the bellows closest to the end of the inner pipe could alternatively be attached to a circumferential portion of the inner surface of the outer pipe near the end of the outer pipe and the other end of the bellows could be attached to a circumferential portion of the outer surface of the inner pipe closely adjacent to the other end of the bellows. While this embodiment would involve greater difficulties in fabrication, it would function appropriately once fabricated. Finally, the one end of the bellows furthest from the end of the inner and outer pipes could be attached to a directly adjacent circumferential portion of the outer surface of the inner pipe and the other end of the bellows could be attached by means of an extending cylindrical member such as member 7 to a circumferential portion of the inner surface of the outer pipe adjacent to this one end of the bellows. In all cases, the bellows would still allow longitudinal relative motion between the inner and outer pipes while maintaining the seal at the end of the annular space between these two pipes. The other end of this annular space would be sealed by a structure such as shown in FIG. 1 comprising ring 15 and related structure.

In one embodiment wherein the compensator of this invention was employed on an oil pipe string, the outer diameter of the oil pipe string 2 was 88 mm plus or minus 0.02 mm and the inner diameter of the surface of compensator pipe section 10 directly adjacent the outer surface of the pipe string 2 was 87.87 mm plus or minus 0.02. In assemblying the compensator structure onto the pipe, the pieces 15 and 10 were heated to 325°-350° C. The inner pipe preferably is as specified in API Bulletin 5C2, 9 published in 1966.

In certain situations, it may be acceptable to weld the shrink fit pieces 10 and 15 to the interior pipe (although this preferably is avoided). When this is done, the pipe and pieces 15 and 10 are preheated to about 300° C. and the weld is carried out with a basic electrode denoted Ductiland 50. During welding the temperature of the regions being welded should not drop below 300° C. After welding the structure is heat treated for two hours at 620° C. and then cooled in calm air. Each annular space between the outer pipe and the inner pipe is then pressurized with nitrogen at about 70 atmospheres (1030 psi) to test the integrity of the joining of pieces 15 and 10 to the inner pipe. The other welds such as 11b and 12 shown in FIG. 1 are carried out with an Inconel 182 electrode. The coupling 19 is a VAM coupling which is torqued to about 4400 ft. pounds (600 meter-kilograms) after the threads have been degreased and a Molycote paste has been applied with a chamois or a sponge.

The following equations are of use in calculating the forces created between the compensator structure pipe section 10 and the inner pipe string 2 by the shrink fit. In Equation (1) P is the pressure in kgf/cm$^2$ as a result of the shrink fit between pipe section 10 and pipe string 2:

$$P = \frac{1}{\frac{d}{E_o \Delta}\left[\frac{D_o^2 + d^2}{D_o^2 - d^2} + V_o\right] + \frac{d}{E_i \Delta}\left[\frac{d^2 + d_i^2}{d^2 - d_i^2} + V_i\right]} \quad (1)$$

where:
di = inner diameter of inner ring in mm,
d = inner diameter of outer ring and the outer diameter of the inner ring in mm,
Do = outer diameter of the outer ring in mm,
Vo = Poisson constant for the material of the outer ring,
Vi = Poisson constant for the material of the inner ring,
Eo = elasticity modulus for the material of the outer ring in Kgf/cm$^2$,
Ei = elasticity modulus for the material of the inner ring in Kgf/cm$^2$,
Δ = effective fitting measure in mm.

Delta (Δ) is the difference between the outside diameter $d_1$ of the inner pipe 2 and the inside diameter $d_2$ of the cylindrical material 10 prior to the joining of these materials. That is:

$$\Delta = d_1 - d_2 \quad (2)$$

internal pressure $$\sigma_r = -P[r^2/(R^2 - r^2)] \cdot [(R^2 - X^2)/X^2] \quad (3)$$

$$\sigma_t = +P[r^2/(R^2 - r^2)] \cdot [(R^2 + X^2)/X^2] \quad (4)$$

external pressure $$\sigma_r = -P[R^2/(R^2 - r^2)] \cdot [(Xhu\ 2 - r^2)/X^2] \quad (5)$$

$$\sigma_t = -P[R^2/(R^2 - r^2)] \cdot [(X^2 + r^2)/X^2] \quad (6)$$

where:

P = pressure as a result of the shrink fitting or gas forces, etc. in Kgf/cm$^2$,
r = radius of inner diameter of inner pipe in mm,
R = radius of outer diameter of outer pipe in mm,
X = radius of the middle diameter on which one would like to determine the forces in mm,
$\sigma_r$ = radial force as a result of an internal or external pressure in Kgf/cm$^2$,
$\sigma_t$ = tangential force as a result of an internal or external pressure in Kgf/cm$^2$.

FIG. 5 shows an alternative embodiment of the structure shown in FIG. 3 wherein sleeve 7 is removed and the ring 4 is welded directly to the outer pipe section 6 (shown in FIG. 1) by means of a ring 8 (also shown in FIG. 1). Weld 9 joining ring 8 to outer sleeve 6 is formed with a standard welding electrode. Weld 7 joining ring 8 to inner ring 4 is formed using an Inconel 182 electrode. Likewise weld 11a joining ring 11 to annular collar 3 is similarly formed using an Inconel 182 electrode. Weld 12b joining material 10 to inner pipe 2 is formed using an alkaline ("basische") electrode Ductiland 50. The material is then heat treated as described above in connection with the option of joining the compensating structure to inner pipe 2 by both a shrink fit and a weld. FIG. 5 essentially provides a simplified structure by removing the extra sleeve 7 but in its place, outer pipe section 6 must be welded by means of weld 6a to exterior pipe 1. Weld 6a is made using a standard electrode.

Turning to FIG. 1, coupling 19 can, if desired, be placed on the outer pipe 1 rather than on inner pipe 2. This allows the outer pipe to bear the load of the pipe string. The adjacent ends of the inner pipe sections 2a and 2b are then not joined together but are left apart to allow these pipes to thermally expand without substantially changing the overall length of the pipe string. To do this, threads are formed on the outer surface of outer pipe 1 at both ends and the weld 13 of FIG. 1 is eliminated by using a compensator of the type shown in FIG. 3. Steam then fills the cavity between the bellows 5 and sleeve 6 and is prevented from entering annular space 17 by the bellows 5, sleeve 6 and ring 8, at one end, and by annular ring 15 at the other end.

One other feature of plug 16 shown in FIG. 4 is of interest. Recessed section 67 is designed so that the portion of plug stem 61 containing nut 69 to the left of recess 67 shears off if a worker attempts to completely remove plug stem 61 from ring 15 without first removing balls 65.

While several embodiments of this invention have been shown, other embodiments will be obvious to those skilled in the art in view of the above disclosure.

What is claimed is:

1. A structure for sealing the annular space between an inner pipe and an outer pipe, coaxially mounted, with an annular space between them comprising:

a first pipe section for concentrically overlying said inner pipe, said first pipe section having a first end and a second end, said first end of said first pipe section being adapted to be attached to one end of the inner pipe;

first annular-shaped ring means joined circumferentially around and to the outer surface of the first end of said first pipe section;

second annular-shaped ring means slidably formed around the outer surface of the second end of said first pipe section;

a second pipe section having substantially the same inner and outer diameters as said outer pipe, said second pipe section having circumferentially attached to its inner surface said second annular-shaped ring means;

an annular-shaped bellows diaphragm one end of which is circumferentially, joined to said first annular-shaped ring means and the other end of which is joined to said second annular-shaped ring means, said annular-shaped bellows diaphragm extending concentrically and longitudinally along the outside of said first pipe section and inside said second pipe section and being adapted to expand or contract in the direction of the longitudinal axes of said inner and outer pipes; and said second pipe section being adapted to be joined to the outer pipe in said pipe string thereby to seal said annular space, said second annular-shaped ring means being adapted to move longitudinally relative to said first pipe section attached to said inner pipe.

2. Structure as in claim 1 wherein said first end of said first pipe section is adapted to be shrunk fit on said one end of said inner pipe.

3. Structure as in claim 1 including a third annular-shaped ring means adapted to be circumferentially attached on its inner surface to the other end of said inner pipe and on its outer surface to said outer pipe thereby to seal at both ends said annular space between said inner and outer pipe.

4. Structure as in claim 3 wherein said third annular-shaped ring means is adapted to be shrunk fit on said other end of said inner pipe.

5. Structure as in claim 3 wherein said third annular-shaped ring means contains a pressure relief valve formed in a portion thereof.

6. Structure for sealing one end of the annular space formed between an inner pipe and an outer pipe coaxially mounted with respect said inner pipe in such a manner as to allow relative movement of the inner pipe and outer pipe along the longitudinal axes of the two pipes, comprising:

an annular-shaped bellows means placed in said annular space at said one end of said coaxially mounted inner and outer pipes, said annular-shaped bellows means being adapted to expand or contract along the longitudinal axes of said inner and said outer pipes;

means joining one end of said annular-shaped bellows means to said inner pipe around one complete outside circumference of a cross-section of said inner pipe;

means joining the other end of said annular-shaped bellows means around one complete inside circumference of a cross-section of said outer pipe, thereby to allow relative motion between said inner and outer pipes along the longitudinal axes of said pipes to expand or contract said annular-shaped bellows means so as to maintain the seal at said one end of said annular space between said inner and outer pipe;

wherein said other end of the annular space between said inner and outer pipes is sealed by an annular-shaped ring attached to said inner pipe completely around an outer circumference thereof and to said outer pipe completely around an inner circumference thereof.

7. Structure as in claim 6 wherein said annular-shaped ring includes a pressure relief valve adapted to release pressure in said annular space.

8. Structure as in claim 7 wherein said annular-shaped ring includes pressure relief means for relieving the pressure in said annular space and for allowing any fluids in said annular space to be removed, thereby to determine whether or not said annular space leaks.

* * * * *